United States Patent [19]

Watabe

[11] Patent Number: 4,569,476
[45] Date of Patent: Feb. 11, 1986

[54] METHOD FOR CONTROLLING A TEMPERATURE
[75] Inventor: Shin Watabe, Aichi, Japan
[73] Assignee: Mitsubishi Jukogyo Kabushiki Kaisha, Tokyo, Japan
[21] Appl. No.: 640,230
[22] Filed: Aug. 13, 1984

Related U.S. Application Data

[63] Continuation-in-part of Ser. No. 627,907, Jul. 5, 1984, abandoned.

[30] Foreign Application Priority Data

Jul. 4, 1983 [JP] Japan ................. 58-120298

[51] Int. Cl.⁴ .................................. G05D 23/00
[52] U.S. Cl. .................................. 236/47; 165/12; 165/27; 62/213
[58] Field of Search .............. 62/209, 203, 213; 236/46 R, 47, 78 B, 91 F; 165/12, 27

[56] References Cited

U.S. PATENT DOCUMENTS 3,381,488  5/1968  Lewis ................. 62/308 X
4,395,886  8/1983  Mayer ................ 62/209 X
4,399,428  8/1983  Hughes et al. ......... 236/78 B

FOREIGN PATENT DOCUMENTS 54-165466  6/1979  Japan .
2100474  12/1982  United Kingdom .
2119131  11/1983  United Kingdom .

Primary Examiner—William E. Wayner
Attorney, Agent, or Firm—Wenderoth, Lind & Ponack

[57] ABSTRACT

A method for controlling a temperature of an object to be cooled or heated by a cooling/heating apparatus is improved in that when all of a plurality of temperature detectors for detecting a temperature of the object are operating normally, the cooling/heating capacity of the cooling/heating apparatus is regulated in response to input signals consisting of the detection temperature of the respective temperature detectors according to an operation pattern set in a normal time thermostat. When it has been determined that a certain temperature indicated by a detector is abnormal, then the cooling/heating capacity of the cooling/heating apparatus is regulated in response to input signals consisting of the detection temperatures of the other normal temperature detectors according to an operation pattern set in an abnormal time thermostat that is different from the operation pattern set in the normal time thermostat; thus the temperature of the object can thereby be controlled.

6 Claims, 10 Drawing Figures

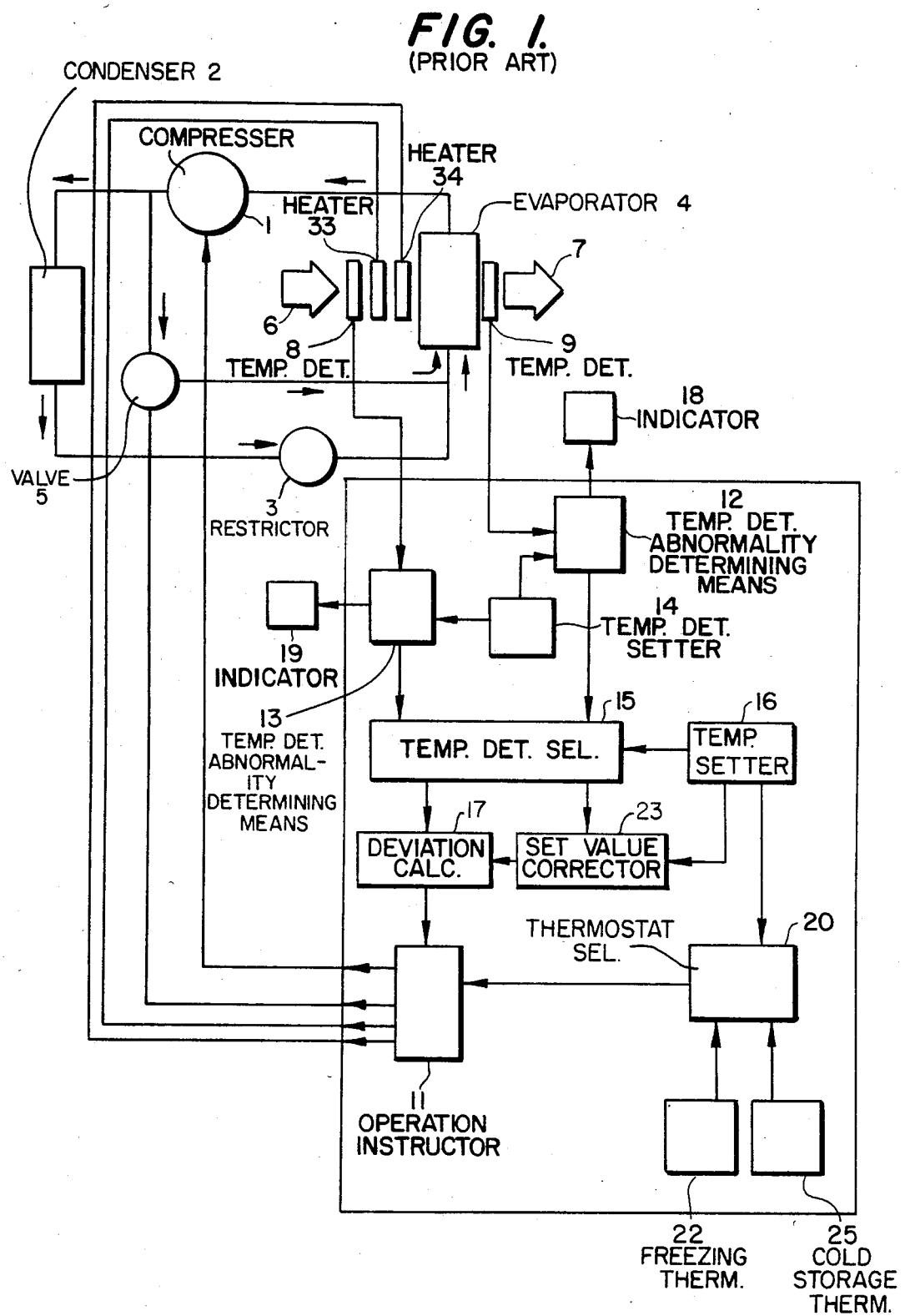

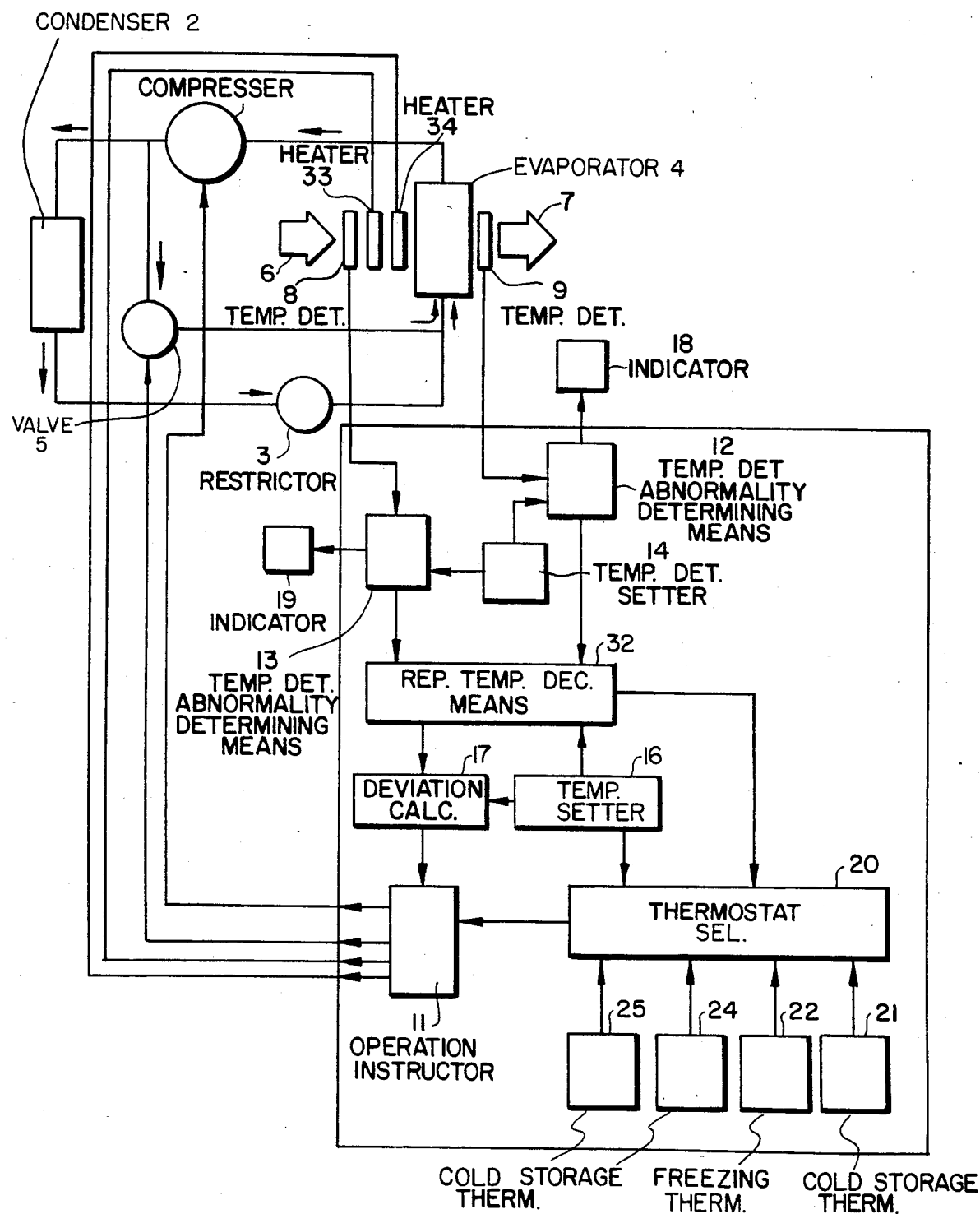

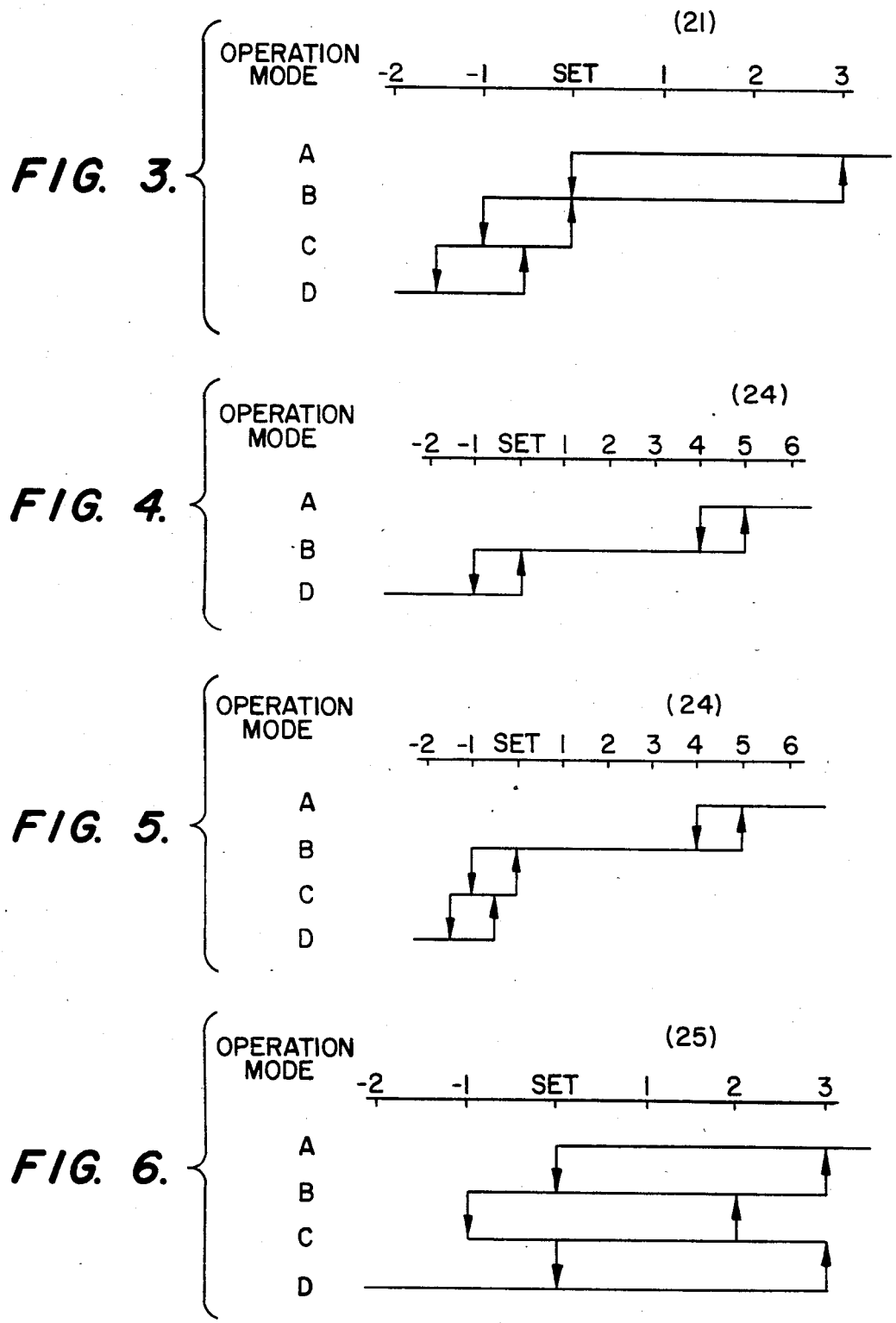

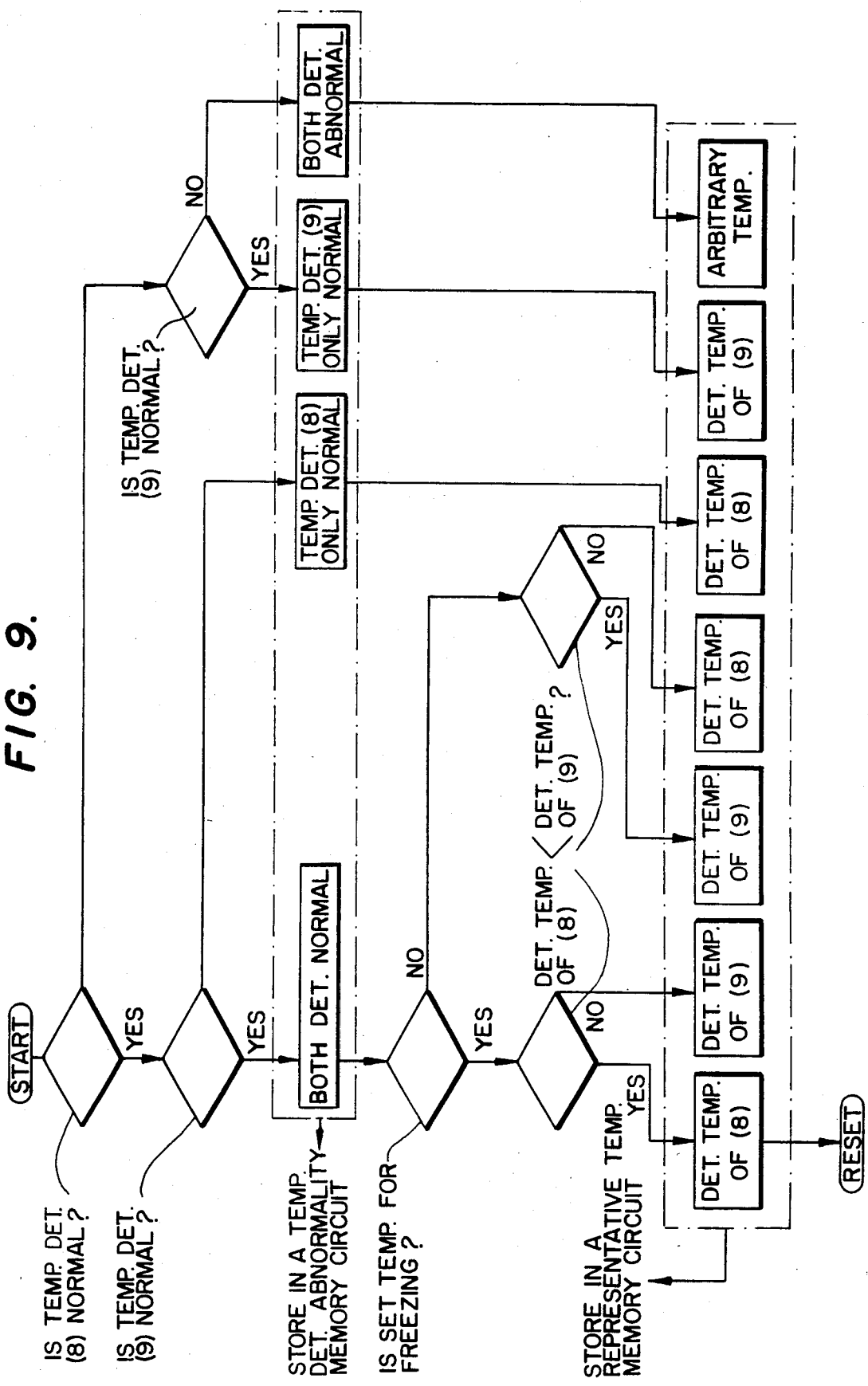

METHOD FOR CONTROLLING A TEMPERATURE

This application is a continuation-in-part of now abandoned application Ser. No. 627,907, filed July 5, 1984.

BACKGROUND OF THE INVENTION

The present invention relates to a method for controlling a temperature, and more particularly, to a temperature control method that is suitable for controlling a temperature of air within a chamber called a "freezing container" in which articles to be transported are accommodated.

One example of a temperature control method in a freezing container in the prior art will be explained with reference to FIG. 1. In this figure, a gaseous refrigerant discharged from a refrigerant compressor (1) enters a condenser (2) in which the refrigerant is cooled and condenses into liquid, thereafter it enters a restrictor (3) in which it expands adiabatically, then it enters an evaporator (4) in which the refrigerant itself is heated as a result of cooling the air circulating through the chamber accommodating articles and evaporates into gas, and the refrigerant returns to the compressor (1) in a gaseous state. By opening a valve (5), a part of the gaseous refrigerant discharged from the compressor (1) detours the condenser (2) and the restrictor (3) and enters the evaporator (4) without radiating heat, hence an air cooling capacity in the evaporator (4) can be reduced, and therefore, the air cooling capacity can be decreased or increased by increasing or decreasing, respectively, the degree of opening of the valve (5).

A temperature of a return air (6) from the chamber accommodating articles is detected by a temperature detector (8), and a temperature of a blow-out air (7) which has been cooled by the evaporator (4) is detected by a temperature detector (9). The detection temperature detected by the temperature detector (8) is input to temperature detector abnormality determining means (13), in which the detection temperature is compared with an abnormal condition range set in temperature detector abnormal condition setting means (14). In the event that the detection temperature falls within this abnormal condition range, the temperature detector abnormality determining means (13) determines that the temperature indicated by the detector (8) is abnormal, and makes the result of this determination indicated on indicator means (19). At the same time the determining means (13) instructs temperature detector selecting means (15) not to use the detection temperature of the temperature detector (8) for control purposes. Likewise, the detection temperature detected by the temperature detector (9) is input to temperature detector abnormality determining means (12), in which the detection temperature is compared with an abnormal condition range that is input from the temperature detector abnormal condition setting means (14). In the event that the detection temperature falls within this abnormal condition range, the temperature indicated by the detector abnormality determining means (12) determines that the temperature detector (9) is abnormal, and calls indicator means (18) to indicate the result of this determination. At the same time, the determining means (12) instructs the temperature detector selecting means (15) not to use the detection temperature of the temperature detector (9) for control purposes. In the case where neither of the temperature detectors (8) and (9) is abnormal, the temperature detector selecting means (15) receives a set temperature preset in the temperature setting means (16), and depending upon this set temperature, it selects a detection temperature of which one of the temperature detectors (8) and (9) should be used for control purposes. In addition, the set temperature preset in the temperature setting means (16) is input to thermostat selecting means (20). The thermostat selecting means (20) then selects either a cold storage thermostat (25) or a freezing thermostat (22), depending upon the set temperature.

In FIG. 6 is shown an operation instructed by the cold storage thermostat (25). Operation mode (A) indicates a strong cooling operation by switching ON the compressor (1); operation mode (B) indicates a weak cooling operation in which regulation of a degree of opening of the valve (5) is effected while operating the compressor (1); operation mode (C) indicates a weak heating operation by passing a current through a heater (33), and operation mode (D) indicates a strong heating operation by passing currents through both the heater (33) and a heater (34).

Assuming now that the temperatures indicated by both temperature detectors (8) and (9) have been determined not to be abnormal in the temperature detector abnormality temperature means (13) and (12), respectively, and a temperature corresponding to the cold storage condition has been set in the temperature setting means (16). Then in response to signals issued from these means, the temperature detector selecting means (15) selects the use of the detection temperature of the temperature detector (9) for control purposes according to the set temperature corresponding to the cold storage condition. The thermostat selecting means (20) also responds to a signal issued from the temperature setting means (16) and selects the use of the cold storage thermostat (25) according to the set temperature corresponding to the cold storage condition. Then, the detection temperature of the selected temperature selector (9) is supplied from the temperature detector selecting means (15) to a deviation calculator (17). At the same time, the set temperature preset in the temperature setting means (16) passes through a set value correcting means (23) without being corrected therein and is supplied to the deviation calculator (17); in this deviation calculator (17), the detection temperature of the temperature detector (9) and the set temperature are compared so as to calculate the deviation therebetween. This deviation is input to an operation instructor (11), in which the deviation is compared with an operation pattern input from the cold storage thermostat (25), and an operation mode selected according to the result of the comparison is instructed from the operation instructor (11). Assuming now that the detection temperature of the temperature detector (9) is 4° C. and the set temperature is 0° C., then a deviation of +4 deg. is calculated in the deviation calculator (17) and is input to the operation instructor (11). In the operation instructor (11), the deviation of +4 deg. is compared with the operation pattern of the cold storage thermostat (25) as shown in FIG. 6 hence, the operation mode (A), corresponding to the deviation of +4 deg. is instructed from the operation instructor (11), and the operation of the compressor (1) is started. As a result of the operation of the compressor (1), air is cooled by the evaporator (4) resulting in the lowering of the air temperature. When the detection temperature of the temperature detector (9) becomes 0° C. and the deviation from the set temperature 0° C. becomes equal to zero, then a transfer to an operation according to the operation mode (B) is instructed from the operation instructor (11), so as to cause the deviation of the detection temperature from the set temperature to become equal to zero. The control is effected by opening and closing the valve (5) while operating the compressor (1). If a thermal load changes in excess of a controllable range of this operation mode, and if the detection temperature becomes −1° C. which is lower than the set temperature 0° C. by 1 deg., then the operation instructor (11) instructs the transfer to the operation mode (C), and so, a weak heating operation is carried out by passing a current through the heater (33). Naturally, the temperature of the blow-out air (7) would rise. However, if the deviation of the detection temperature from the set temperature 0° C. is still continuously kept less than zero due to the lowering of the ambient air temperature, for example, then the operation instructor (11) instructs the transfer to the operation mode (D), and so, a strong heating operation is carried out by passing currents through the heater (33) and the heater (34). When the detection temperature is rising and when the deviation has reached +3 deg., the operation is transferred from the operation mode (D) to the operation mode (C); when the deviation has become +2 deg., the operation is transferred from the operation mode (C) to the operation mode (B), and when the deviation has reached +3 deg., the operation is transferred from the operation mode (B) to the operation mode (A). In the case where the temperature indicated by both temperature detectors (8) and (9) are determined not to be abnormal and a temperature corresponding to a freezing condition is set in the temperature setting means (16), then a deviation of the detection temperature of the temperature detector (8) from the set temperature is compared with an operation pattern (not shown) of the freezing thermostat (22). An operation mode is then selected according to the result of the comparison, said selection being instructed from the operation instructor (11).

The following description is made for the case where the temperature indicated by the detector (9) has been determined to be abnormal and a temperature 0° C. corresponding to the cold storage condition has been set in the temperature setting means (16).

In this case, the temperature detector selecting means (15) does not select the detection temperature of the temperature detector (9) which corresponds to the set temperature 0° C., but selects the use of the detection temperature of the temperature detector (8) for control purposes, and so, the latter detection temperature is input to the deviation calculator (17). In this instance, the set temperature preset in the temperature setting means (16) is input to the set value correcting means (23). In correcting means (23), the set temperature is corrected so as to be raised by a predetermined fixed amount that is equivalent to the temperature difference between the temperature of the return air (6) and the temperature of the blow-out air (7) upon a cooling operation, for example, by 3 deg. The corrected set temperature is then input to the deviation calculator (17). In the deviation calculator (17), the deviation of the detection temperature of the temperature detector (8) from the corrected set value is calculated. This deviation is input to the operation instructor (11), in which the deviation is compared with an operation pattern of the cold storage thermostat (25). An operation mode selected on the basis of the result of this comparison is instructed from the operation instructor (11).

It is to be noted that in the case where the temperature indicated by the detector (8) has been determined to be abnormal, the control operation is not affected at all upon cold storage, and upon freezing, except for the fact that control is effected by making use of the temperature detector (9). In the set value correcting means (23), the set temperature is corrected so as to be lowered by a predetermined fixed amount, for example, by 2 deg., and the control operation is substantially identical to that described above with respect to the other points. Accordingly, a further description thereof has been omitted.

In the above-described temperature control method in the prior art, in the event that either one of the temperature indicated by the detectors has been determined to be abnormal, the temperature control can be achieved by making use of the temperature of the other temperature detector which is normal. However, in this case, since the set temperature preset in the temperature setting means (16) is corrected by a fixed amount equivalent to the temperature difference between the temperature of the return air (6) and the temperature of the blow-out air (7) upon cooling, it is impossible to always carry out proper correction. For instance, in the case of the carrying out of a heating operation, there is a disadvantage that in if the above-mentioned correction is effected, then the target temperature may possibly become too high or too low.

SUMMARY OF THE INVENTION

It is therefore one object of the present invention to provide a method for controlling a temperature which is free from the above-described disadvantages in the prior art.

Another object of the present invention is to provide a method for controlling a temperature in which even if at least one of the temperatures indicated by a plurality of temperature detectors is determined to be abnormal, temperature control that is closer than the prior art to that under the condition where every temperature detector is normal can be achieved by making use of only the other temperature detectors.

According to one feature of the present invention, there is provided an improved method for controlling a temperature of an object to be cooled or heated by a cooling/heating apparatus. When all of a plurality of temperature detectors for detecting a temperature of the object are normally operating, the cooling/heating capacity of the cooling/heating apparatus is regulated in response to input signals consisting of the detection temperatures of the respective temperature detectors according to an operation pattern set in a normal time thermostat. When it has been determined that a temperature indicated by a certain temperature detector is abnormal, then the cooling/heating capacity of the cooling/heating apparatus is regulated in response to input signals consisting of the detection temperatures of the other normal temperature detectors according to an operation pattern set in an abnormal time thermostat that is different from the normal time thermostat; thus, the temperature of the object can be thereby controlled.

According to the present invention, even if some of the temperature indicated by a plurality of temperature detectors are determined to be abnormal, so long as a normal temperature is indicated by at least one detector temperature control that is closer than the prior art to the normal time control, can be achieved. The is because the temperature control is carried out by making use of the detection temperatures of the normal temperature detectors as input signals and the control is carried out according to an operation pattern set in an abnormal time thermostat that is different from the operation pattern set in a normal time thermostat.

BRIEF DESCRIPTION OF THE DRAWINGS

The above-mentioned and other objects, features and advantages of the present invention will become more apparent by reference to the following description of one preferred embodiment of the invention taken in conjunction with the accompanying drawings, wherein:

FIG. 1 is a system diagram showing one example of a method for controlling a temperature of a freezing container in the prior art;

FIG. 2 is a system diagram showing one preferred embodiment of the present invention as applied to a method for controlling a temperature of a freezing container, and FIGS. 3 to 6 show operation patterns instructed by different cold storage thermostats in the case where the control system is operating normally and in the case where at least one temperature indicated by the detectors has become abnormal.

FIG. 9 is a flow chart of the representative temperature deciding means.

DESCRIPTION OF THE PREFERRED EMBODIMENT

Figure 7:
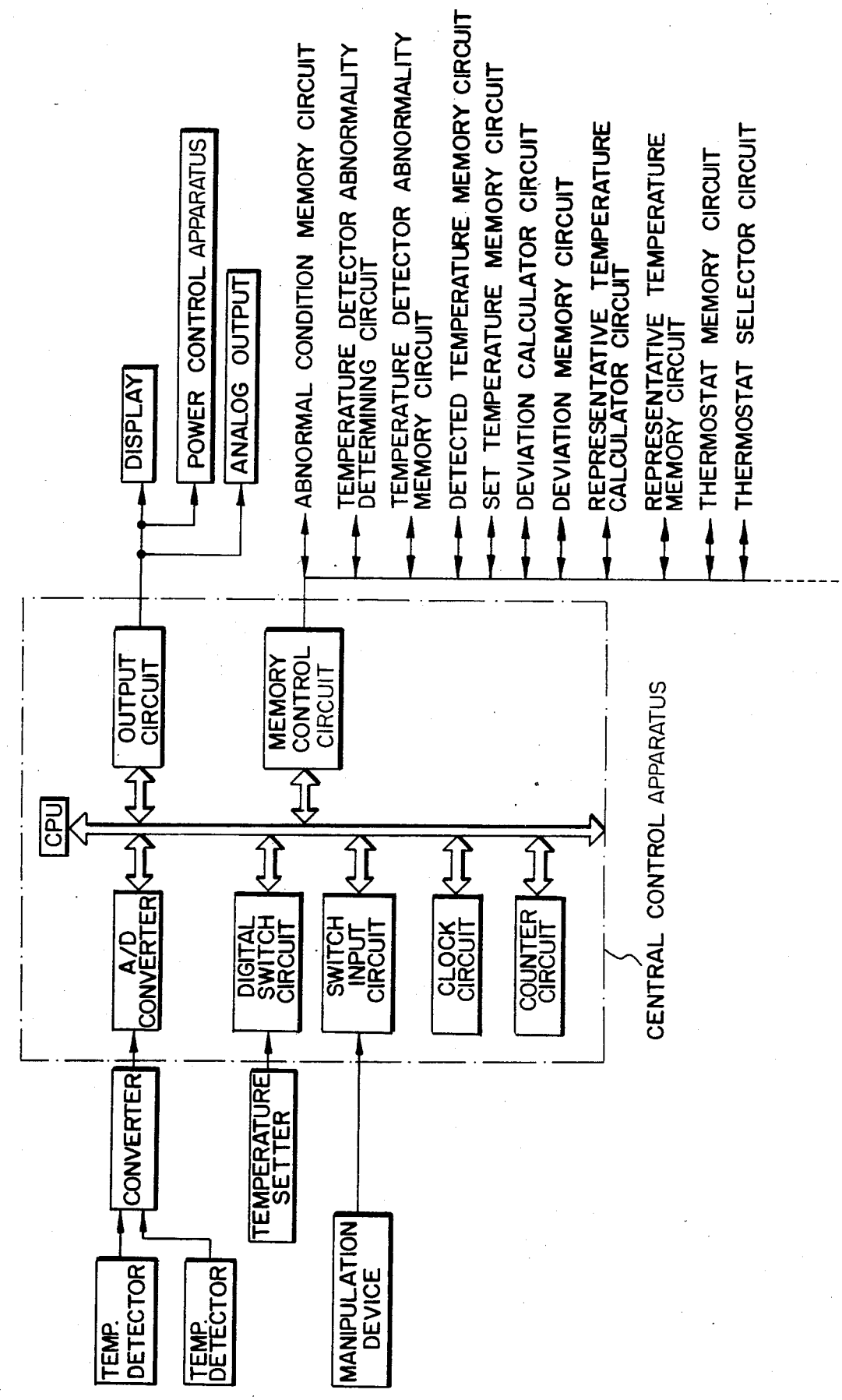
FIG. 7 illustrates a block disgram of an entire temperature control system.

In the following, one preferred embodiment of the present invention will be described in more detail with reference to FIG. 2. In this figure, reference numeral (21) designates a cold storage thermostat for use upon the normal indication from every temperature detector, numeral (22) designates a freezing thermostat, numeral (32) designates a representative temperature deciding means, numeral (24) designates a cold storage thermostat A for use upon the abnormal operation of a temperature detector, and numeral (25) designates a cold storage thermostat B for use upon the abnormal indication of a temperature detector. When neither of the temperature detectors (8) and (9) indicates a temperature which is abnormal, the representative temperature deciding means (32) decides a representative temperature to be used for control purposes, depending upon a set temperature preset in temperature setting means (16). This representative temperature is not only decided by selecting either one of the detection temperatures of the temperature detectors (8) and (9), but also it could be decided according to a result of a comparative calculation of both the detection temperatures, for instance, by always selecting the higher one of the detection temperatures as a representative temperature or by selecting an average value of the both temperatures as a representative temperature. When this representative temperature indicated by deciding means (32) has received an instruction that the temperature detector (8) or (9) is abnormal from temperature detector abnormality determining means (13) or (12), respectively, it disregards the detection temperature of the abnormal temperature detector (8) or (9) upon deciding a representative temperature and decides the detection temperature of the normal temperature detector (9) or (8) as a representative temperature. Thermostat selecting means (20) receives instructions from the temperature setting means (16) and the representative temperature deciding means (32). In the case where neither of the temperature detectors (8) and (9) indicates a temperature which is abnormal, and if the set temperature preset in the temperature setting means (16) corresponds to a cold storage condition, then the thermostat selecting means (20) selects the cold storage thermostat (21). When the set temperature corresponds to a freezing condition, the temperature setting means (16) selects the freezing thermostat (22). In the case where the set temperature preset in the temperature setting means (16) corresponds to a cold storage condition, and if the temperature indicated by the detector (9) is abnormal, then the thermostat selecting means (20) selects the temperature detector abnormal time cold storage thermostat A (24). When the temperature indicated by the detector (8) is abnormal, the thermostat selecting means (20) selects the temperature detector abnormal time cold storage thermostat B (25). This temperature detector abnormal time cold storage thermostat B (25) is identical to the cold storage thermostat (25), which was described previously in connection to one example of the temperature control method in the prior art with reference to FIG. 1. This is because both the cold storage thermostats (25) in FIGS. 1 and 2 achieve temperature control by making use of the temperature detector (9). In FIG. 3 is shown an operation pattern instructed by the temperature detector normal time cold storage thermostat (21); in FIG. 5 is shown an operation pattern instructed by the temperature detector abnormal time cold storage thermostat A (24), and in FIG. 6 is shown an operation pattern instructed by the temperature detector abnormal time cold storage thermostat B (25). As will be apparent by comparing FIGS. 3, 5 and 6 with one another, these operation patterns are quite different from one another despite of the fact that they are all operation patterns for use upon cold storage.

Now description will be made on the case where neither temperature indicated by the detectors (8) and (9) is abnormal and also the set temperature preset in the temperature setting means (16) corresponds to a cold storage condition, for instance, is set at 0° C. The representative temperature deciding means (32) decides a lower detection temperature of the detection temperatures of both the temperature detectors (8) and (9), that is, the temperature of the blow-out air (7) during a cooling operation, for example, 4° C. as the representative temperature, and the thermostat selecting means (20) selects the temperature detector normal time cold storage thermostat (21). Then, the detection temperature 4° C. of this temperature detector (9) is subjected to comparative calculation with the set temperature 0° C. in the deviation calculator (17), and the deviation of +4 deg. is input to an operation instructor (11). In the operation instructor (11), the deviation +4 deg. is compared with the operation pattern shown in FIG. 3 of the cold storage thermostat (21) which has been selected by the thermostat selecting means (20); hence, operation mode (A) corresponding to the deviation +4 deg. is instructed from the operation instructor (11), and therefore, an operation of a compressor (1) is started. In other words, according to FIG. 3, a temperature deviation of +4 deg. falls in the range of the operation mode Ⓐ. Therefrom, the operation is effected according to the operation mode Ⓐ. Since the operation mode Ⓐ is a strong cooling operation as described above, the compressor is started to be driven. As a result of the operation of the compressor (1), air is cooled by an evaporator (4); hence, the air temperature is lowered, and when the representative temperature decided on the basis of the detection temperatures of the temperature detectors (8) and (9) has become 0° C. and the deviation of the representative temperature from the set temperature has thereby become zero, then the transfer to an operation according to operation mode (B) is instructed from the operation instructor (11). Thus, a valve (5) is opened and closed while operating the compressor (1) so as to control the temperature of the air in such manner that the deviation of the representative temperature from the set temperature may become equal to zero. In the event that a thermal load changes in excess of the controllable range of the operation mode (B), and if the representative temperature becomes −1° C., that is, lower than the set temperature 0° C. by 1 deg., then the operation instructor (11) instructs transfer to operation mode (C). Thus, a weak heating operation is carried out by passing a current through the heater (33). During the operation according to the operation mode (C), since the return air (6) has a lower temperature than the blow-out air (7) due to the fact that the operation is a weak heating operation, the detection temperature of the temperature detector (8) disposed in the return air (6) is used as the representative temperature. If the deviation of the representative temperature from the set temperature becomes −1.5 deg. or lower due to lowering of the ambient air temperature, for example, then the operation instructor (11) instructs transfer to operation mode (D). Thus, a strong heating operation is carried out by passing currents through the heater (33) and the heater (34). If the representative temperature is rising, when the temperature deviation has reached −0.5 deg., the operation transfers from the operation mode (D) to the operation mode (C). When the temperature deviation has become equal to zero, the operation transfers from the operation mode (C) to the operation mode (B). When the temperature deviation has reached 3 deg., the operation transfers from the operation mode (B) to the operation mode (A). In the case where the temperature indicated by the detector (9) is abnormal, the temperature is controlled according to the operation pattern shown in FIG. 5 of the temperature detector abnormal time cold storage thermostat A (24). In the case where the temperature indicated by the detector (8) is abnormal, the temperature is controlled according to the operation pattern shown in FIG. 6 of the temperature detector abnormal time cold storage thermostat B (25). FIG. 3 shows an example of an operation pattern instructed by the temperature detector normal time cold storage thermostat (21). Operation mode Ⓐ indicates a strong cooling operation effected by solely driving the compressor (1). Operation mode Ⓑ indicates a weak cooling operation effected by controlling the degree of opening the valve (5) while driving the compressor (1). Operation mode Ⓒ indicates a weak heating operation effected by energizing the heater (33) only. Lastly, operation mode Ⓓ indicates a strong heating operation effected by energizing both heaters (33) and (34).

When the apparatus is operated under the operation mode Ⓐ, the lower temperature of the two temperatures indicated by the temperature detectors (8) and (9) is used. That is, the temperature of the blow-out air (7) indicated by the temperature detector (9) is used in this case as the representative temperature if the deviation of the representative temperature from the set temperature becomes equal to zero as the result of the operation of the compressor (1). The operation instructor (11) then instructs the transfer of the operation pattern from the operation mode Ⓐ in the operation mode Ⓑ. In mode Ⓑ, the degree of opening of the valve (5) is controlled so that the deviation of the representative temperature from the set temperature may be kept equal to zero. However, in the event that the thermal load changes in excess of the controllable range of the operation mode Ⓑ and the representative temperature becomes lower than the set temperature by, for example, 1 deg., then the operation instructor (11) instructs the transfer of the operation pattern from the operation mode Ⓑ to the operation mode Ⓒ. In mode Ⓒ, the compressor (1) is stopped, and the valve (5) is closed, and the heater (33) is energized. Since the operation mode Ⓒ is a heating operation mode, the representative temperature used is shifted to the temperature of the return air (6), which is indicated by the temperature detector (8). If the deviation of the representative temperature from the set temperature is further increased and becomes equal to minus 1.5 deg. due to, for example, the lowering of the ambient air temperature, then the operation instructor (11) instructs the transfer of the operation pattern from the operation mode Ⓒ to the operation mode Ⓓ. In mode Ⓓ, the heater (34) is additionally energized.

On the other hand, during a period of time in which the representative temperature is rising, the above-noted transition is reversed: if the deviation of the representative temperature form the set temperature becomes equal to minus 0.5 deg. during the operation of the system under the operation mode Ⓓ, then the operation pattern is transferred to the operation mode Ⓒ. Thereafter, if the representative temperature further rises and the deviation becomes equal to zero, then the operation pattern is transferred from the operation mode Ⓒ to the operation mode Ⓑ. If the representative temperature then continues to rise and the deviation reaches +3 deg., then the operation pattern is transferred from the operation mode Ⓑ to the operation mode Ⓐ.

FIG. 5 show an example of an operation pattern instructed by the temperature detector abnormal time cold storage thermostat A (24). The respective operation modes are similar to those in FIG. 3, and the control is effected in the same manner as described above based upon the temperature indicated by the temperature detector (8).

FIG. 6 shows an example of an operation pattern instructed by the temperature detector abnormal time cold storage thermostat B (25). In this case too, the respective operation modes are similar to those in FIG. 3, and the control is effected in the same manner as described above based upon the temperature indicated by the temperature detector (9).

It is to be noted that although in the above-described cases shown in FIGS. 3, 5, and 6, the thermostats have the same operation modes Ⓐ, Ⓑ, Ⓒ, and Ⓓ and issue the same operation instructions, these operation modes and operation instructions need not be the same, but different modes and instructions may be used in the respective cases as required. FIG. 4 shows one example of such a different operation mode which is instructed by a thermostat (24') used instead of the temperature detector abnormal time cold storage thermostat A (24)

which operates with the operating pattern shown in FIG. 5.

As described above, in the illustrated embodiment, even in the event that abnormality should arise in the temperature indicated by one of the temperature detectors, the temperature can be controlled according to the thermostat (24) or (25) which contains an operation pattern adapted to the other temperature detector that is normal. Therefore, a more appropriate and more accurate temperature control becomes possible as compared to the temperature control method in the prior art in which temperature control is effected by merely subjecting a set temperature to correction.

A control system is composed of a central control apparatus (microprocessor), a storage device (memories) and an interface, and the representative temperature deciding means (32) is formed of the central control apparatus and the memory among these component elements. In the memories processed by the representative temperature deciding means (32) under the control of the central control apparatus are included memories constituting the temperature detector abnormality determining means (12) and (13) and the temperature setting means (16). These memories belonging to the representative temperature deciding means (32) are used for processing the deviation calculator (17) and the thermostat selecting means (20). What are stored in the memories forming the respective elements processed by this representative temperature deciding means (32) are as follows temperature detector abnormality determining means (12):
 a detected temperature by the temperature detector (9) and whether abnormality of the temperature detector (9) exists or not.
temperature detector abnormality determining means (13):
 a detected temperature by the temperature detector (8) and whether abnormality of the temperature detector (8) exists or not.
temperature setting means (16): a set temperature.

In a memory of the representative temperature deciding means (32) is stored a sequence of processings for the data stored in the respective memories for deciding a representative temperature, and the central control apparatus operates according to this sequence of processings to achieve the function of the representative temperature deciding means (32). The process for deciding this representative temperature is not so important, and one example of the process is, as previously described, that as a result of comparative calculation between a detected temperature by the temperature detector (9) and a detected temperature by the temperature detector (8), in the case where the set temperature is in a freezing region, for instance, always a high temperature is decided as a representative temperature. As a matter of course, the above-mentioned is true only in the case where the indicated temperatures of both the temperature detectors (8) and (9) are dtermined to be normal, and in the event that one of the temperatures indicated by detectors (8) and (9) is abnormal, of course, a detected temperature by the other temperature detector is decided to be a representative temperature. In this way, the representative temperature is decided, and the combination of this decided value and existence on non-existence of abnormalities of the respective indicated temperatures of detectors (8) and (9) is stored in the memory of the representative temperature decided means (32).

Figure 8:
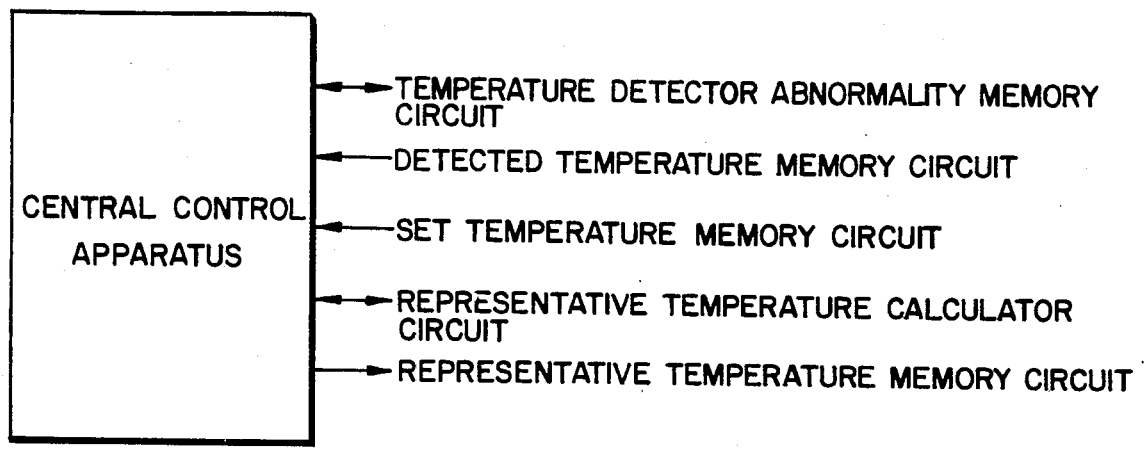
FIG. 8 illustrates a representative temperature deciding means.

A contruction of the entire temperature control system is schematically shown in FIG. 7, and a construction of the representative temperature deciding means (32) (See FIG. 2) is illustrated in FIG. 8 also attached hereto. What is shown in FIG. 7 is a general construction of a control apparatus making use of a microprocessor, and therefore, explanation of the operation of the control apparatus will be omitted.

One example of the operation of the representative temperature deciding means (32) shown in FIG. 8 is as described above, and the above-described operation in the case where the temperature detectors (8) and (9) are both normal is identical to the operation of the comparator (12) described and illustrated in the copending U.S. patent application Ser. No. 492,171, filed May 6, 1983 and having common inventorship with the present application.

A flow chart illustrating one example of the process of the representative temperature deciding means (32) is shown in FIG. 9. The combination of existence or non-existence of abnormalities of the temperature indicates by detectors (8) and (9) is used by the termostat selecting means (20), and the representative temperature is used by the deviation calculator (17).

Figure 10:
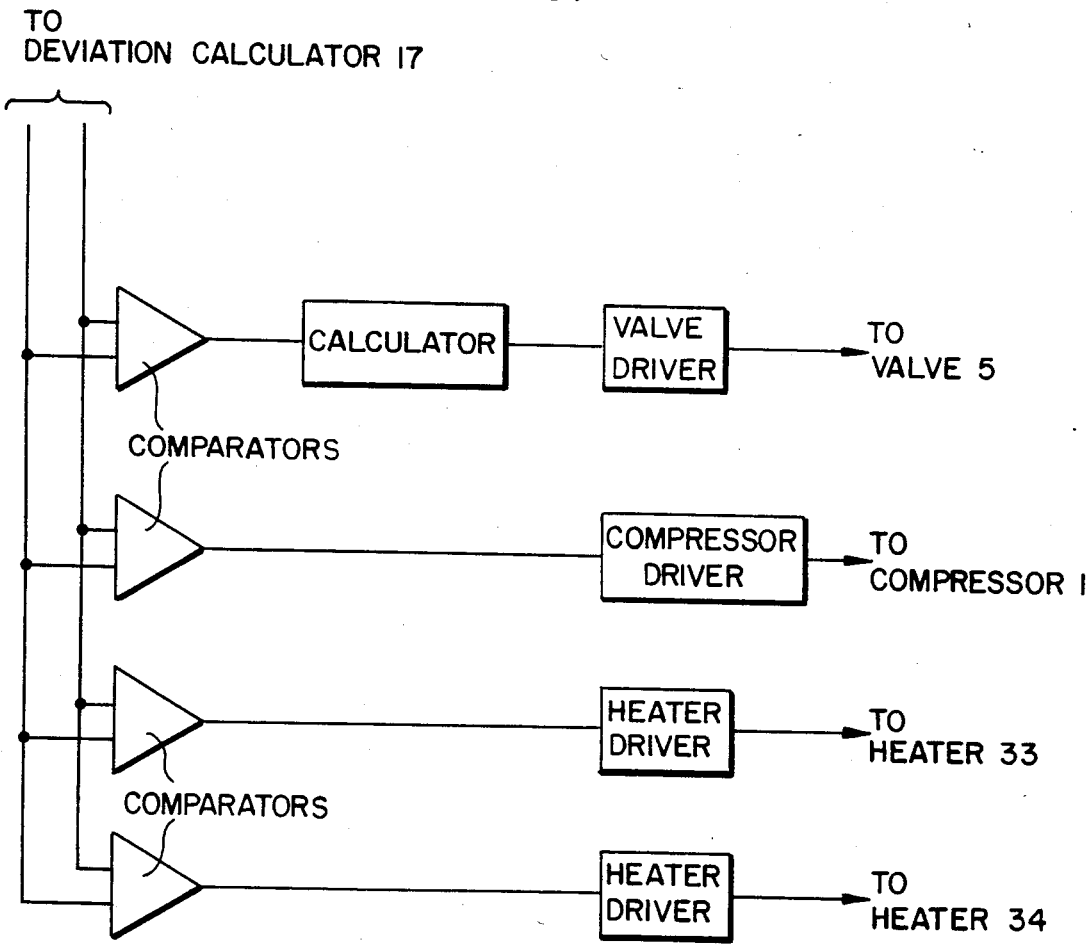
FIG. 10 illustrates the operation instructor of FIG. 2.

The construction and operation of the freezing operation instructor (11) is illustrated in FIG. 10 and the operation thereof is apparent to one skilled in the art such that a detailed description thereof has been omitted.

While description was omitted with respect to the case where abnormality of the temperature indicated by the detector has arisen in the event that a temperature corresponding to a freezing condition is set in the temperature setting means in connection to the above-described embodiment, a temperature detector abnormal time freezing thermostat which instructs a further different operation pattern in the just mentioned case, could be additionally provided. Furthermore, four or more operation modes to be instructed by each thermostat could be provided, and the contents of the operation mode instructions instructed by the respective thermostats could be different from each other. FIG. 4 shows one example of such different contents, which represents another example of an operation pattern of a thermostat (24') to be replaced for the temperature detector abnormal time cold storage thermostat A (24) shown in FIG. 5. In addition, while a temperature of air within a chamber in which articles are to be accommodated was controlled in the above-described embodiment, the present invention is not limited to such application but is widely applicable to temperature control of any object which is heated and/or cooled by a heating-/cooling apparatus, and three or more temperature detectors could be employed so long as they serve to detect different temperatures of the object.

Since many changes and modifications could be made to the above-described method without departing from the spirit of the present invention, it is intended that all matter contained in the above description and illustrated in the accompanying drawings shall be interpreted to be illustrative and not as a limitation to the scope of the invention.

What is claimed is:

1. A method for controlling a temperature of an object to be cooled or heated by a cooling/heating apparatus, wherein when every one of a plurality of temperature detectors for detecting a temperature of said object is normally operating, a cooling/heating capacity of said cooling/heating apparatus is regulated in response to input signals consisting of the detection temperatures of the respective temperature detectors according to an operation pattern set in a normal time thernostat, whereas when it has been determined that a temperature detected by certain temperature detector is abnormal, the cooling/heating capacity of said cooling/heating apparatus is regulated in response to input signals consisting of the detection temperatures of the other normal temperature detectors according to an operation pattern set in an abnormal time thermostat that is different from said normal time thermostat, and thus, the temperature of the object can be controlled.

2. A method for controlling a temperature as claimed in claim 1, wherein a temperature of an airflow from the obejct returning to said cooling/heating apparatus is detected by at least one of the plurality of temperature detectors, and a temperature of an airflow from the object blowing out of the cooling/heating apparatus is detected by at least one of the other temperature detectors.

3. A method for controlling a temperature as claimed in claim 2, wherein a representative temperature is determined out of the detection temperatures of the plurality of temperature detectors, and this representative temperature is used as an input signal.

4. A method for controlling a temperature as claimed in claim 3, wherein said representative temperature is determined depending upon a set temperature.

5. A method for controlling a temperature as claimed in claim 2, wherein there are provided a plurality of abnormal time thermostats, one of which corresponds to a temperature detector for detecting a return temperature of said airflow from the object, and another of which corresponds to a temperature detector for detecting a blow-out temperature of said airflow from the object.

6. A method for controlling a temperature as claimed in claim 5, wherein in said plurality of abnormal time thermostats are set different operation patterns, respectively.

* * * * *